United States Patent [19]

Hosaka et al.

[11] 4,122,667

[45] Oct. 31, 1978

[54] SYSTEM FOR DETECTING ABNORMALITY IN FUEL FEED CONTROL SYSTEM OF GAS TURBINE ENGINE

[75] Inventors: Akio Hosaka; Eiji Tsuruta, both of Yokohama, Japan

[73] Assignee: Nissan Motor Company, Limited, Yokohama, Japan

[21] Appl. No.: 748,299

[22] Filed: Dec. 7, 1976

[30] Foreign Application Priority Data

Dec. 8, 1975 [JP] Japan .......................... 50/165504[U]

[51] Int. Cl.$^2$ .............................................. F02C 7/26
[52] U.S. Cl. ................................ 60/39.09 R; 60/39.14
[58] Field of Search ............... 60/39.09 R, 39.14, 223, 60/39.28 R

[56] References Cited

U.S. PATENT DOCUMENTS

| | | | |
|---|---|---|---|
| 3,420,691 | 10/1969 | Smith | 60/39.14 |
| 3,691,759 | 9/1972 | Scheerer | 60/39.14 |
| 3,793,826 | 2/1974 | Holleboom et al. | 60/39.14 |
| 4,044,551 | 8/1977 | Nelson et al. | 60/39.14 |

Primary Examiner—Louis J. Casaregola
Attorney, Agent, or Firm—Bacon & Thomas

[57] ABSTRACT

For a gas turbine engine provided with a fuel feed control system that includes an engine speed sensor and provides a fuel feed rate control signal based on the deviation of the sensed engine speed from an intended speed, the invention provides a system for detecting the presence of an abnormality possibly leading to an overrun of the engine shortly after starting of the engine. This system comprises a timer circuit which produces a signal such as logic "1" signal after the lapse of a preset period of time from starting of the engine, a comparison circuit which produces a signal such as logic "1" signal if the amplitude of the actual engine speed signal is below a normally expected level after the lapse of the preset period of time, and a logical operation circuit which provides a warning signal only when, for example, the outputs of the timer and comparison circuits are both "1" signals.

6 Claims, 3 Drawing Figures

SYSTEM FOR DETECTING ABNORMALITY IN FUEL FEED CONTROL SYSTEM OF GAS TURBINE ENGINE

This invention relates to a fuel system of a gas turbine engine, and more particularly to a system for detecting the presence of an abnormality in a fuel feed control system which provides a control signal based on the comparison of a signal representing actual engine speed with a reference signal.

A conventional fuel feed control system of a feedback type in a gas turbine engine system, particularly, for automotive use includes an engine speed sensor component which produces an electrical signal representing actual speed (rpm) of the gas turbine engine and a deviation detector component in which the actual engine speed signal is compared with a reference signal representing an intended engine speed. The control system provides a control signal, which is either an analog or digital signal, based on the output of the deviation detector component to a flow control valve in a fuel circuit.

If a certain abnormality in the function of, for example, the engine speed sensor component is present such that the speed signal produced by the sensor component does not exactly represent an actual engine speed but indicates a lower engine speed, the control system functions to raise the fuel feed rate even when the engine runs at a speed higher than an intended speed. Then there is a fear of an overrun of the engine. The overrun is dangerous and, even if no accident results, significantly impairs the drivability of the vehicle. When the engine is operated in a steady state, the presence of such abnormality can be sensed by the operator of the engine from, for example, the response of the engine or the vehicle to the manipulation of a fuel feed rate regulation device. Besides, the described abnormality will not readily lead to an overrun of the engine if the engine is in a steady state operation and is provided with a temperature control system.

However, the presence of the described abnormality cannot readily be detected and is liable to cause the overrun in a period immediately after starting of the engine because of a great and abrupt variation in the fuel flow rate, a rapid rise in the engine speed and ineffectiveness of a temperature control system due to low engine temperature. Usually and normally, gas turbine engines attain an engine speed of 5000 rpm or above in about 2 seconds after starting of the engine. An idle speed of about 20000 rpm is attained in a few seconds. Accordingly the engine will possibly overrun if the described abnormality is present in the fuel feed rate control system but is not detected within a few seconds immediately after starting of the engine.

It is an object of the invention to provide a system for detecting the presence of an abnormality in a fuel feed rate control system of the described type in a gas turbine engine, which detection system can detect an abnormality possibly leading to an overrun of the engine within a short period of time immediately after the starting of the engine.

For a fuel feed control system for a gas turbine engine, that includes sensor means to produce an electrical first signal representing actual engine speed and control means for producing a fuel feed rate control signal based on the magnitude of a deviation of the actual engine speed signal from a reference signal representing a variably intended engine speed an improvement comprising a subsystem for detecting the presence of an abnormality in the fuel feed control system shortly after the starting of the engine, which abnormality may be a phenomenon that the first signal indicates an engine speed lower than the actual engine speed. The abnormality detection subsystem comprises: timer means for producing an electrical second signal after the lapse of a present period of time from the starting of the engine, said preset period of time being chosen such that when the second signal is produced, the engine speed is low enough to take preventive action against the occurrence of an overrun if an abnormality is detected at this moment; comparing means for producing an electrical third signal if the amplitude of the first signal is below a preset value corresponding to an engine speed normally expected after the lapse of the predetermined period of time from the starting of the engine; and logic means, connected to receive the second and third signals from the timer means and the comparing means for producing an electrical warning signal only when the third electrical signal has a predetermined relationship to the second electrical signal.

The preset period of time is chosen such that the engine speed after the lapse of this time is low and predictable and that the abnormality indicated by the warning signal can easily be coped with before the occurrence of a significant overrun of the engine. The second and third signals are usually logic signals individually capable of taking one of logic "1" and logic "0" states. Accordingly, both the timer means and the comparison circuit preferably comprise an operational amplifier while the logic operation circuit is an AND circuit.

The invention will fully be understood from the following detailed description of a preferred embodiment with reference to the accompanying drawings, wherein.

Figure 1:
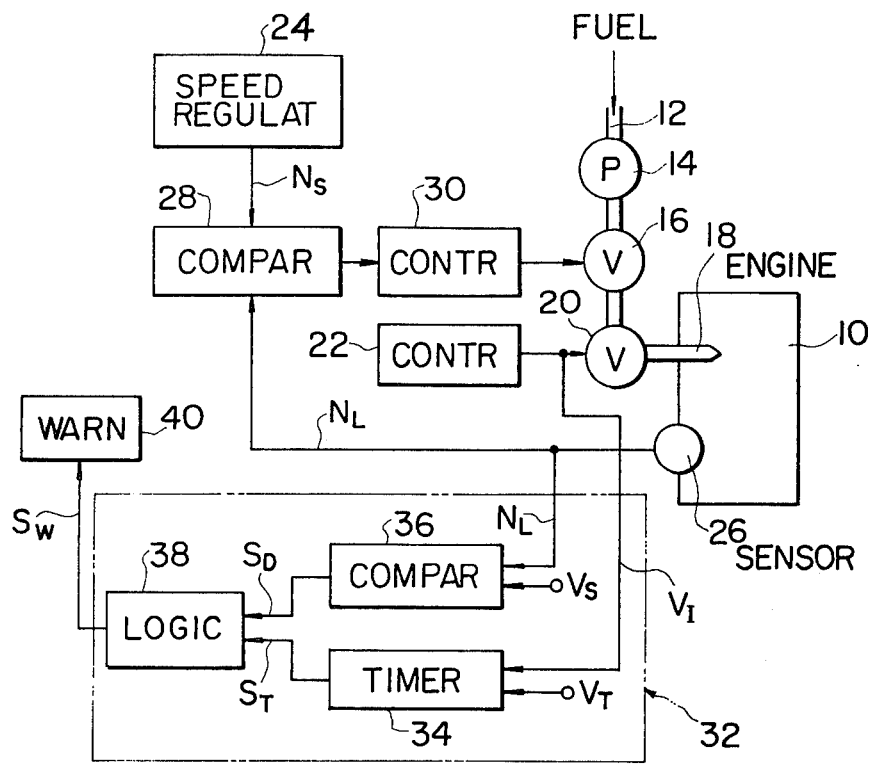
FIG. 1 is a block diagram of an abnormality detection system according to the invention in association with a conventional fuel feed control system in a gas turbine engine.

Referring to FIG. 1, fuel is supplied to a gas turbine engine 10 from a fuel tank (not shown) through fuel line 12 which includes a fuel pump 14 and terminates at an injection nozzle 18. The fuel line 12 is provided with a flow control valve 16 at a section downstream of the pump 14 and a shut-off valve 20 between the control valve 16 and the nozzle 18. The shut-off valve 20 is operated by an electrical controller 22 to selectively provide and interrupt fluid communication through the fuel line 12: the shut-off valve 20 is shifted from the closed state to the open state at starting of the gas turbine engine 10.

A conventional fuel feed control system is fundamentally made up of a speed regulator circuit 24 which provides a reference signal $N_S$ representing an intended engine speed (rpm), a sensor circuit 26 which produces a feedback signal $N_L$ representing actual speed (rpm) of the gas turbine engine 10, a deviation detection or comparison circuit 28 which receives the signals $N_S$ and $N_L$ together with additional inputs representing other factors of the operational condition of the engine 10 such as the temperature and pressure and produces an output representing the deviation of the signal $N_L$ from the reference signal $N_S$, and a control circuit 30 which supplies a control signal to the flow control valve 16 based on the output of the comparison circuit 28. The amplitude of the reference signal $N_S$ can be varied by the manipulation of an accelerator pedal or lever. The control system is usually designed such that the engine speed rises as the amplitude of the signal $N_S$ increases but may alternatively be designed contrary. The sensor circuit 26 has an engine speed sensor such as, for example, a tacho-generator or a combination of a magnet rotatable with the engine 10 and a pickup coil. The control circuit 30 is constructed to produce an analog control signal when the flow control valve 16 is of a continuously regulatable type but a digital control signal in the case of an on-off functioning valve 20.

A first component of a system 32 according to the invention for detecting abnormality in the function of the above described fuel feed control system is a timer circuit 34 which receives a shut-off valve opening signal $V_I$ from the controller 22 and a preset reference voltage $V_T$ and produces an output signal $S_T$ after the lapse of a preset period of time $T_S$ from the moment of the appearance of the signal $V_I$. A comparison circuit 36, as a second component of the abnormality detection system 32, receives the actual engine speed signal $N_L$ and a preset reference signal $V_S$ to produce an output signal $S_D$ when the amplitude of the signal $N_L$ is, for example, below the amplitude of the reference signal $V_S$. The reference signal $V_S$ represents an engine speed (rpm) that is expected after the lapse of the preset period of time $T_S$ from the start of the engine 10 when the fuel feed control system functions normally. Both of the output signals $S_T$ and $S_D$ are logic signals which selectively take logic "1" (high level) and logic "0" (low level) states. The abnormality detection system 32 further comprises a logical operation circuit or logic circuit 38 which receives the output signals $S_T$ and $S_D$ from the timer circuit 34 and the comparison circuit 36 and provides an output signal $S_W$ only when the relationship between the two input logic signals $S_T$ and $S_D$ is a predetermined one. The output signal $S_W$ is supplied to a warning means 40 such as a buzzer and/or a lamp.

For example, the timer circuit 34 provides "0" signal before the lapse of the preset period of time $T_S$ from the starting of the engine 10 and thereafter "1" signal, while the comparison circuit 36 provides "1" signal when the amplitude of the actual engine speed signal $N_L$ is below the amplitude of the preset reference signal $V_S$ but "0" signal otherwise. In this case, the logic circuit 38 is constructed so as to produce an output signal, usually in the form of logic "1" signal, indicating the presence of abnormality in the fuel feed control system (the engine speed represented by the signal $N_L$ is lower than an actual engine speed) only if both the timer circuit 34 and the comparison circuit 36 provide "1" signals. Alternatively, the abnormality detection system may be constructed such that the logic circuit 38 produces an output of the described meaning when both the timer circuit 34 and the comparison circuit 36 provide "0" signals. In either case, the output (indicating the presence of abnormality) of the logic circuit 38 is not necessarily "1" signal but may alternatively be "0" signal.

In addition to the actuation of the warning means 40, the output of the logic circuit 38 may optionally be utilized to cause the controller 22 to close the shut-off valve 20 and/or to break off the functional connection between the flow control valve 16 and the controller 30 accompanied by the supply of a moderately preset control signal (which represents a very low fuel feed rate) to the flow control valve 16.

The fuel feed control system may employ either the engine temperature or engine pressure as an alternative to the engine speed which is employed in the system of FIG. 1 as a basis of the control. Alternatively to the shut-off valve opening signal $V_I$, the starting of the engine 10 may be indicated to the timer circuit 34 by the closure of a starter switch, the commencement of the revolution of a starter motor, the generation of an ignition signal or a rise in the fuel pump pressure.

Figure 2:
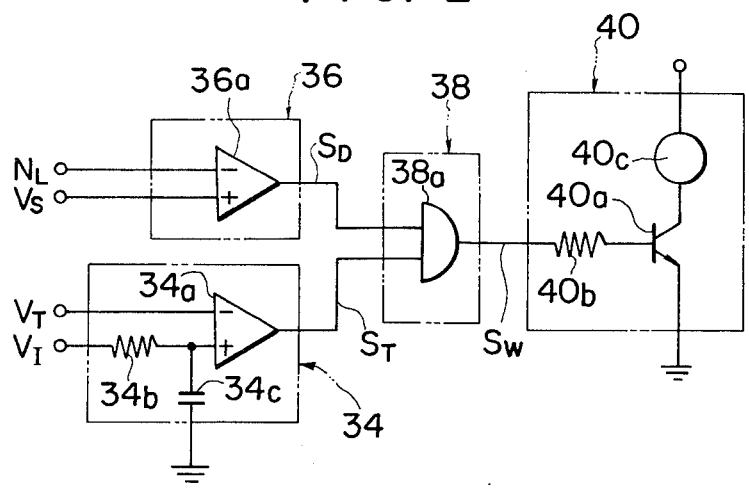
FIG. 2 is a circuit diagram showing an exemplary construction of the abnormality detection system of FIG. 1.

FIG. 2 shows a preferred example of the construction of the abnormality indication system 32 of FIG. 1. The timer circuit 34 has an operational amplifier 34a. The reference voltage $V_T$ is applied to the negative input terminal of the operational amplifier 34a, and the engine start signal $V_I$ is applied to the positive input terminal of the operational amplifier 34a through a resistor 34b. The timer circuit 34 includes a capacitor 34c which can be charged by the voltage of the signal $V_I$ applied through the resistor 34b. The operational amplifier 34a produces "1" signal when the voltage charged in the capacitor 34c rises to the reference voltage $V_T$. The time constant of the r-c circuit including the resistor 34b and the capacitor 34c is so determined as to realize a complete discharge of the stored energy within a time interval between a stop and the succeeding starting of the engine 10.

The comparison circuit 36 is an operational amplifier 36a. The actual engine speed signal $N_L$ and the preset engine speed signal $V_S$ are applied to the negative and positive input terminals, respectively, of this operational amplifier 36a. Accordingly, the operational amplifier 36a produces "1" signal when the signal $N_L$ is below the preset signal $V_S$ in voltage.

The logic circuit 38 is an AND circuit 38a the inputs of which are the signal $S_T$ from the operational amplifier 34a and the signal $S_D$ from the other operational amplifier 36a. Accordingly, the AND 38a provides "1" signal as its output signal $S_W$ only when both of the inputs $S_T$ and $S_D$ are in the "1" state.

The warning means 40 in FIG. 2 includes a transistor 40a with its base connected to the output terminal of the AND 38a through a resistor 40b. The collector of the transistor 40a is connected to an indicator 40c such as a buzzer or a lamp and the emitter is grounded.

Figure 3:
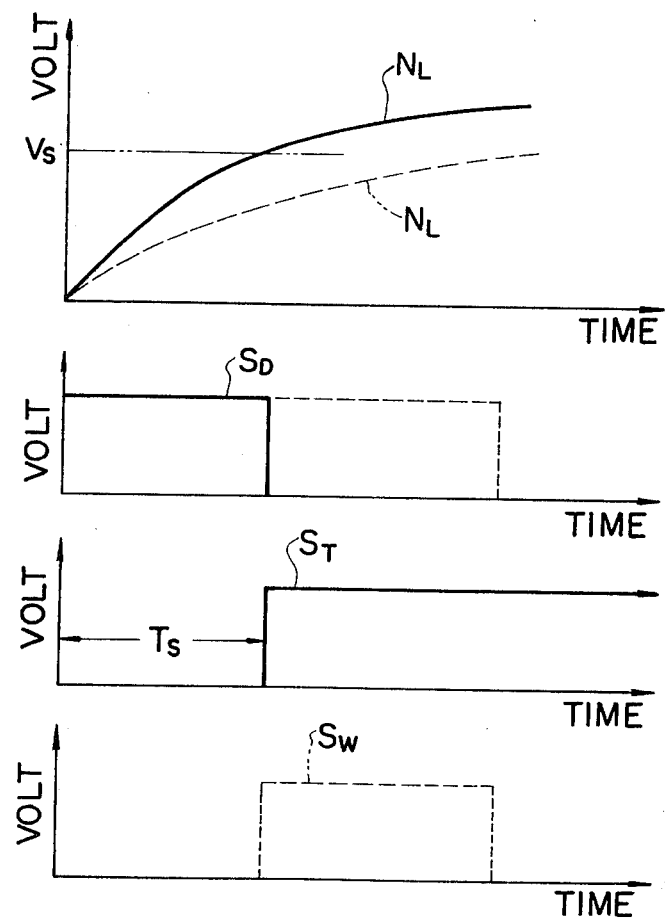
FIG. 3 presents a set of charts explanatorily showing the relationship between the input and output signals in the abnormality detection system shown in FIG. 2.

FIG. 3 shows exemplary waveforms or level-shift patterns of the signals $N_L$, $S_T$, $S_D$ and $S_W$ for the abnormality detection system of FIG. 2. In each of the four charts, the curve in solid line indicates a case when the fuel feed control system functions normally and the curve in broken line an abnormal case when the actual engine speed signal $N_L$ indicates a speed lower than an actual engine speed at any moment.

The amount of the preset time $T_S$ can arbitrarily be determined by suitably determining the reference voltage $V_T$, the resistance of the resistor 34b, the capacitance of the capacitor 34c and the voltage of the engine start signal $V_I$. The amount of the preset time $T_S$ is determined such that the engine speed after the lapse of $T_S$ is still low enough to safely and surely cope with an abnormality of the above described nature which can be detected, if present, after $T_S$ from the engine starting. For example, it is required that the engine 10 can readily be stopped upon detection of the abnormality. It is also necessary that the engine speed after $T_S$ from the starting is predictable. Accordingly, the time $T_S$ may be determined so as to coincide with or be slightly longer than a period of time needed for the engine 10 to attain an idling speed. The time $T_S$ may differently be determined according to the engine temperature at starting.

The logic circuit 38 may be provided with a flip-flop on the output side for maintaining "1" signal $S_W$ produced by the AND 38a until an independent reset signal is supplied to the flip-flop thereby to prevent an early disappearance of a warning indication.

As an alternative to the example shown in FIG. 2, the timer circuit 34 may be a combination of an oscillator and a counter constituting a digital timer circuit. The comparison circuit 36 may be of a digital type on condition that the output of the detection circuit 26 is a digital signal. The concept of the invention may also be embodied into an abnormality detection system which has a timer capable of providing an output signal after the lapse of a preset period of time from the stop of the operation of the fuel feed control system. Such an abnormality detection system is constructed to provide a warning signal if the amplitude of the actual engine speed signal $N_L$ is below a predetermined value when the timer produces an output.

As will have been understood from the foregoing description, an abnormality detection system according to the invention can easily and reliably detect the presence of the described type of abnormality in the engine speed detection circuit, the abnormality including a failure in its elements and electrical connections, in a conventional fuel feed control system for a gas turbine engine in a few seconds after starting of the engine. Accordingly the engine can effectively be prevented from overrunning immediately after starting.

What is claimed is:

1. A fuel feed control system for a gas turbine engine, including sensor means to produce an electrical first signal representing actual engine speed and first comparator means for producing a fuel feed rate control signal based on the magnitude of a deviation of the actual engine speed signal from a reference signal representing a variably intended engine speed, a subsystem for detecting the presence of an abnormality in the fuel feed control system shortly after the starting of the engine, said subsystem comprising:

timer means for producing an electrical second signal after the lapse of a predetermined period of time from the starting of said engine, said predetermined period of time being chosen such that when said second signal is produced the engine speed is low enough to take preventive action against the occurrence of an overrun if an abnormaility is detected at this moment;

second comparator means for producing an electrical third signal if the amplitude of said first signal is below a predetermined value corresponding to an engine speed normally expected after the lapse of said predetermined period of time from the starting of said engine; and logic means, connected to receive said second and third signals from said timer means and said comparing means for producing an electrical warning signal when said third electrical signal has a predetermined relationship to said second electrical signal.

2. A system as claimed in claim 1, wherein said predetermined period of time is chosen so as to be nearly equal to a period of time normally needed for the rise of the engine speed to an idling speed.

3. A system as claimed in claim 1, wherein said second and third signals are logic signals individually capable of taking one of logic "1" and logic "0" states, said logical operation circuit being constructed to provide said warning signal only when said second and third signals take the same logic state.

4. A system as claimed in claim 3, wherein: said timer means comprise a first operational amplifier, a resistor connected to the positive input terminal of said first operational amplifier and a capacitor connected to a junction between said resistor and said positive input terminal, a preset voltage signal as a factor in determining said preset period of time being applied to the negative input terminal of said first operational amplifier, another voltage signal indicating that the engine is in operation being applied to said capacitor through said resistor; said comparison circuit is a second operational amplifier, said first signal and said reference signal being applied to the negative and positive input terminals of said second operational amplifier, respectively; said logical operation circuit is an AND circuit with the input terminals thereof connected respectively to the output terminals of said first and second operational amplifiers.

5. A system as claimed in claim 4, wherein said second and third signals are respectively logic "1" signals.

6. A system as claimed in claim 1, further comprising means for giving a warning on the presence of an abnormality to an operator of the engine upon receipt of said warning signal from said logical operation circuit.

* * * * *